United States Patent
McGlaughlin

(10) Patent No.: US 11,119,658 B2
(45) Date of Patent: Sep. 14, 2021

(54) CAPACITY EXPANSION CHANNELS FOR MEMORY SUB-SYSTEMS

(71) Applicant: Micron Technology, Inc., Boise, ID (US)

(72) Inventor: Edward McGlaughlin, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/672,321

(22) Filed: Nov. 1, 2019

(65) Prior Publication Data

US 2021/0132798 A1 May 6, 2021

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

| | | | |
|---|---|---|---|
| 2007/0263441 A1 | 11/2007 | Cornwell et al. | |
| 2013/0138868 A1* | 5/2013 | Seroff | G06F 3/0688 711/103 |
| 2016/0216912 A1 | 7/2016 | Muralimanohar et al. | |
| 2016/0366024 A1* | 12/2016 | Huang | H04L 67/1097 |
| 2017/0083401 A1 | 3/2017 | Ryu et al. | |
| 2017/0263295 A1 | 9/2017 | Xiao et al. | |
| 2019/0189188 A1 | 6/2019 | Hush et al. | |
| 2020/0183622 A1* | 6/2020 | Hubbard | G06F 3/061 |

OTHER PUBLICATIONS

International Search Report and Written Opinion for International Application No. PCT/US2020/058152, dated Feb. 18, 2021, 10 pages.

* cited by examiner

*Primary Examiner* — Tammara R Peyton
(74) *Attorney, Agent, or Firm* — Lowenstein Sandler LLP

(57) ABSTRACT

A memory sub-system includes a memory sub-system controller comprising at least one host channel, a memory device comprising a plurality of memory die, and at least one input/output (I/O) expander circuit coupled to the at least one host channel of the memory sub-system controller and to the memory device. The at least one I/O expander circuit includes one or more I/O buffers to send and receive signals on the at least one host channel, a selection circuit coupled to the one or more I/O buffers, and command processing logic to enable the selection circuit to route the signals on a selected one of a plurality of expansion channels coupled to the at least one I/O expander circuit. Each of the plurality of expansion channels is coupled to a corresponding subset of the plurality of memory die.

20 Claims, 6 Drawing Sheets

CAPACITY EXPANSION CHANNELS FOR MEMORY SUB-SYSTEMS

TECHNICAL FIELD

Embodiments of the disclosure relate generally to memory sub-systems, and more specifically, relate to capacity expansion for memory sub-systems with an input/output port constrained memory sub-system controller.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
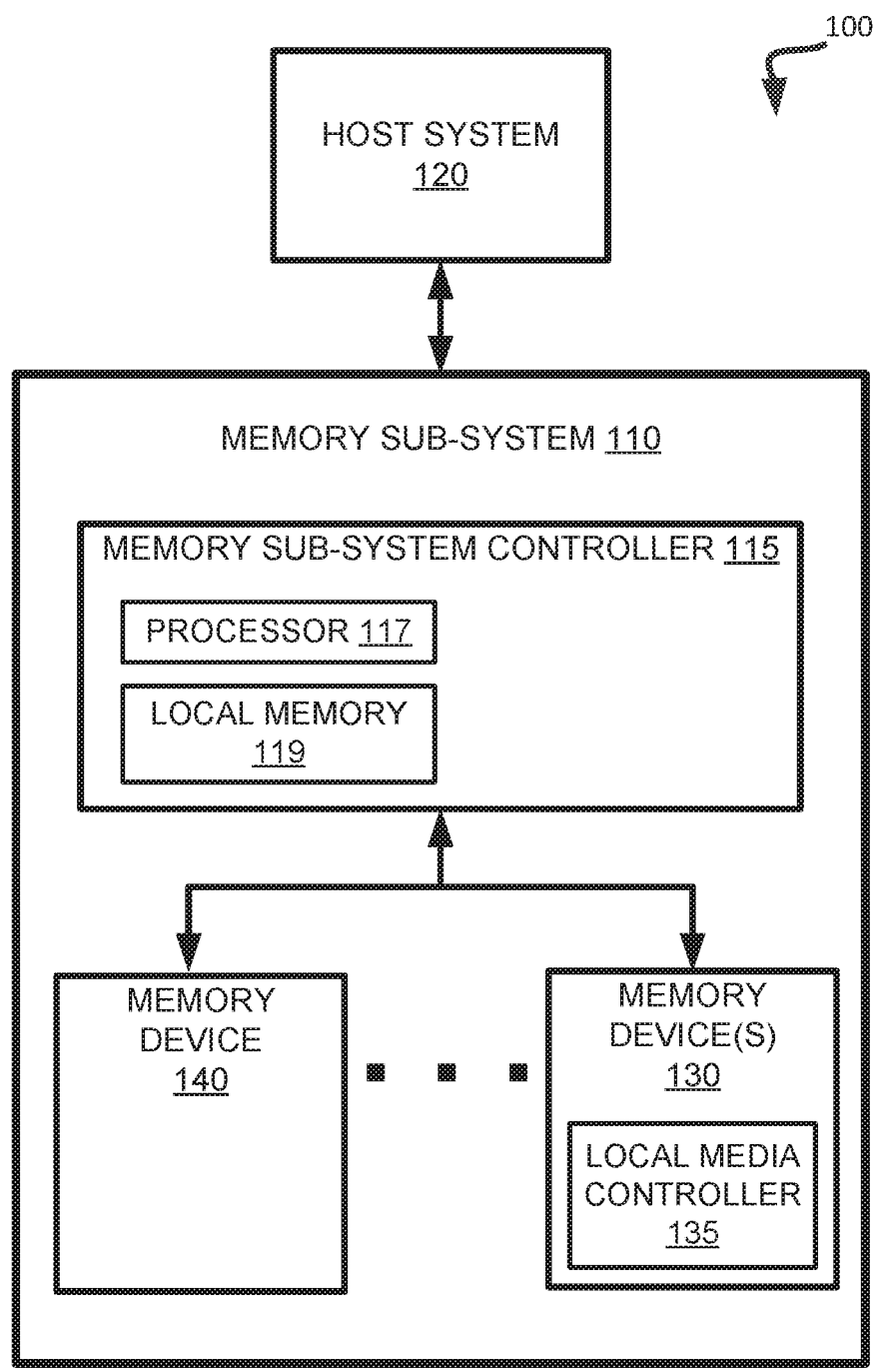
FIG. 1 illustrates an example computing environment that includes a memory sub-system in accordance with some embodiments of the present disclosure.

Aspects of the present disclosure are directed to capacity expansion for memory sub-systems with an input/output port constrained memory sub-system controller. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can include multiple memory devices that can store data from a host system. One example of a non-volatile memory device is a negative-and (NAND) memory device. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write commands, read commands) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword. Metadata can also include data version (e.g. used to distinguish age of data written), valid bitmap (which LBAs or logical transfer units contain valid data), etc.

Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states.

The memory sub-system can initiate media management operations, which can include executing, for example a write operation or read operation, on host data that is stored on a memory device. For example, the memory sub-system can re-write previously written host data from a location on a memory device to the same location or a new location as part of a write refresh operation. In another example, the media management operations can include a re-read of host data that is stored on a memory device as part of a read refresh operation. "User data" hereinafter generally refers to host data and data that is re-written as part of media management. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

The evolving storage needs of host systems are driving towards memory sub-systems with increased capacity and performance at lower costs. The memory sub-system controller (e.g., a system-on-a-chip (SoC)) can be a very costly component. As such, one way to reduce the cost of the memory sub-system is to reduce the size of the memory sub-system controller, such as by limiting the number of host input/output (I/O) ports and channels in the memory subsystem controller. This port constrained memory sub-system controller, however, limits the available capacity of the memory sub-system.

Conventional solutions have attempted to address this issue by using simple switches (e.g., passive expanders) in each host channel to increase the number of memory devices which can be connected to each host channel. While this approach can increase the capacity of the memory sub-system, the full impedance load of the additional memory devices is still presented on the corresponding host channel. This increased load can impact the maximum operating data transfer rate on the channel leading to decreased performance from excessive signal reflection and signal integrity issues. The degraded performance can be unacceptable for many host system applications.

Aspects of the present disclosure address the above and other deficiencies by providing for capacity expansion for memory sub-systems with an I/O port constrained memory sub-system controller. The improved memory sub-system includes a buffering scheme that reduces loading on the host channels of the memory sub-system controller, thereby allowing for higher speed operation, while still providing storage capacity expansion with a lower cost memory sub-system controller. In one embodiment, the memory sub-system includes one or more I/O expanders (IOEs) in each of the existing host channels. Each I/O expander can support up to four expansion channels, where each expansion channel can support up to four memory devices (e.g., NAND memory die). Accordingly, each I/O expander can support up to 16 separate memory devices while providing a buffering scheme that does not increase the impedance load on the existing host channel of the memory sub-system controller. Depending on the embodiment, each host channel can include multiple I/O expanders, such as two I/O expanders (i.e., 32 memory devices) or even up to four I/O expanders (i.e., 64 memory devices). Since the impedance load of the additional memory devices is not presented on the host channel, the memory sub-system controller can still utilize the host channel at a maximum data rate acceptable for host system operations. Thus, additional memory capacity can be made available to the host system without requiring additional host channels to be included in the memory sub-system controller.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a NVM Express (NVMe) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Although non-volatile memory components such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, a particular memory component can include an SLC portion, and an MLC portion, a TLC portion, or a QLC portion of memory cells. The memory cells of the memory devices 130 can be grouped as pages or codewords that can refer to a unit of the memory device used to store data. With some types of memory (e.g., NAND), pages can be grouped to form blocks. Some types of memory, such as 3D cross-point), can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory device 130 includes local media controller 135 that operates in conjunction with memory sub-system controller 115 to execute operations on one or more memory cells of the memory device 130. In some embodiments, the memory device 130 is a managed memory device, which is a raw memory device combined with a local controller (e.g., local controller 135) for media management within the same memory device package. An example of a managed memory device is a managed NAND (MNAND) device.

In one embodiment, the local media controller 135 includes one or more I/O expanders (IOEs) in each of the host channels coupled between memory sub-system controller 115 and the various memory die of memory device 130. For example, memory device 130 can include multiple individual NAND memory die, where each I/O expander can support up to four expansion channels, where each expansion channel can support up to four NAND memory die. Accordingly, each I/O expander can support up to 16 separate memory die while providing a buffering scheme that does not increase the impedance load on the existing host channel of the memory sub-system controller. In another embodiment, the I/O expanders can be implemented in another portion of memory device 130, or in another circuit coupled between memory sub-system controller 115 and memory device 130. For example, in another embodiment, memory device 130 can instead represent a single memory die which can be coupled to an expansion channel provided by an I/O expander, as will be described in more detail below. Depending on the embodiment, each host channel can include multiple I/O expanders, such as two I/O expanders (i.e., 32 memory devices) or even up to four I/O expanders (i.e., 64 memory devices). Since the impedance load of the additional memory devices is not presented on the host channel, the memory sub-system controller can still utilize the host channel at a maximum data rate acceptable for operations of host system 120. Further details pertaining to the use of I/O expanders in memory sub-system 110 are described below.

Figure 2:
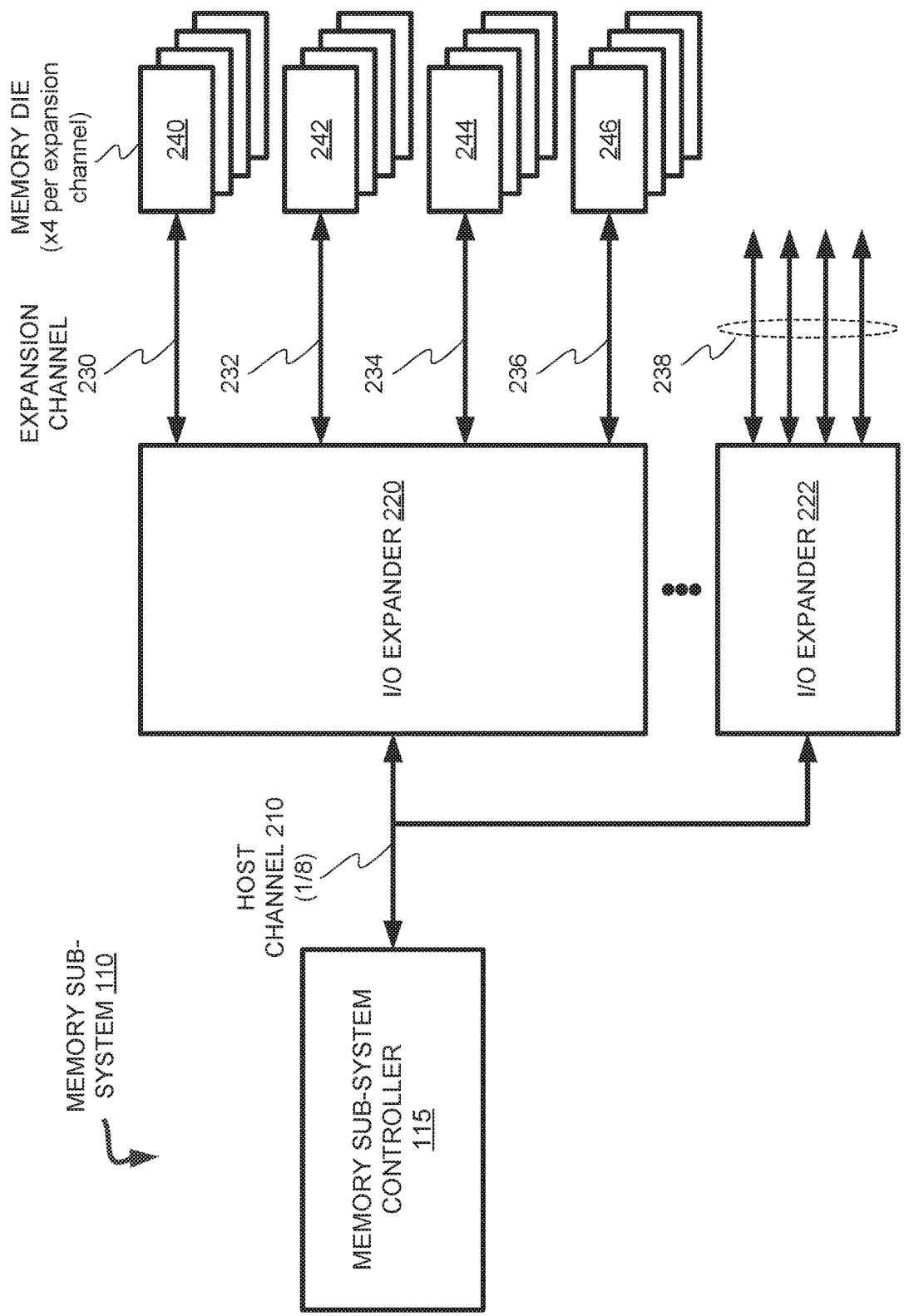
FIG. 2 is a block diagram illustrating a memory sub-system with an input/output port constrained memory sub-system controller implementing I/O expanders to increase the storage capacity in accordance with some embodiments of the present disclosure.

FIG. 2 is a block diagram illustrating a memory sub-system 110 with an input/output port constrained memory sub-system controller 115 implementing I/O expanders 220-222 to increase the storage capacity, in accordance with some embodiments of the present disclosure. In one embodiment, memory sub-system controller 115 includes a number of host input/output ports, each having a corresponding host channel. For example, host channel 210 illustrated in FIG. 2 can be one of multiple host channels connected to memory sub-system controller 115. Depending on the embodiment, memory sub-system controller 115, can have two host channels, four host channels, eight host channels, or some other number of host channels. As the number of host input/output ports and host channels increases, so too does the complexity, cost, and size of the memory sub-system controller. Thus, it can be desirable to limit the number of host input/output ports and channels in the memory sub-system controller 115.

In one embodiment, each of the host channels can include one or more I/O expanders (also referred to herein as "I/O expander circuits"). For example, a number of I/O expanders 220-222 can be connected to host channel 210. The I/O expanders 220-222 can be implemented, for example, in local media controller 135 of memory device 130. In other embodiments, the I/O expanders 220-222 can be implemented in a separate circuit coupled between memory sub-system controller 115 and memory device 130, or elsewhere in the memory sub-system 110. Each of the other host channels connected to memory sub-system controller 115 can also have some number of corresponding I/O expanders, expansion channels, and connected memory die.

Depending on the embodiment, each host channel can include one or more I/O expanders, such as one I/O expander, two I/O expanders, three I/O expanders, or four I/O expanders. Each I/O expander can support up to four expansion channels. For example, I/O expander 220 can include expansion channels 230, 232, 234, and 236. I/O expander 222 can similarly include four expansion channels 238 or some other number of expansion channels, each coupled to some number of memory die (not shown). Each of the expansion channels can support up to four memory devices (e.g., NAND memory die). In one embodiment, memory die 240 are connected to expansion channel 230, memory die 242 are connected to expansion channel 232, memory die 244 are connected to expansion channel 234, and memory die 246 are connected to expansion channel 236. In one embodiment, each expansion channel is connected to the same number of memory die. In other embodiments, however, each expansion channel from the same I/O expander can be connected to a different number of memory die. For example, one expansion channel could be connected to two memory die, while another expansion channel could be connected to four memory die. Accordingly, each I/O expander, such as I/O expander 220, can support up to 16 separate memory devices. As will be described in more detail below, each I/O expander can provide a buffering scheme that does not increase the impedance load associated with the additional memory die 240, 242, 244, 246 on the existing host channel 210 of the memory sub-system controller 115.

Figure 3:
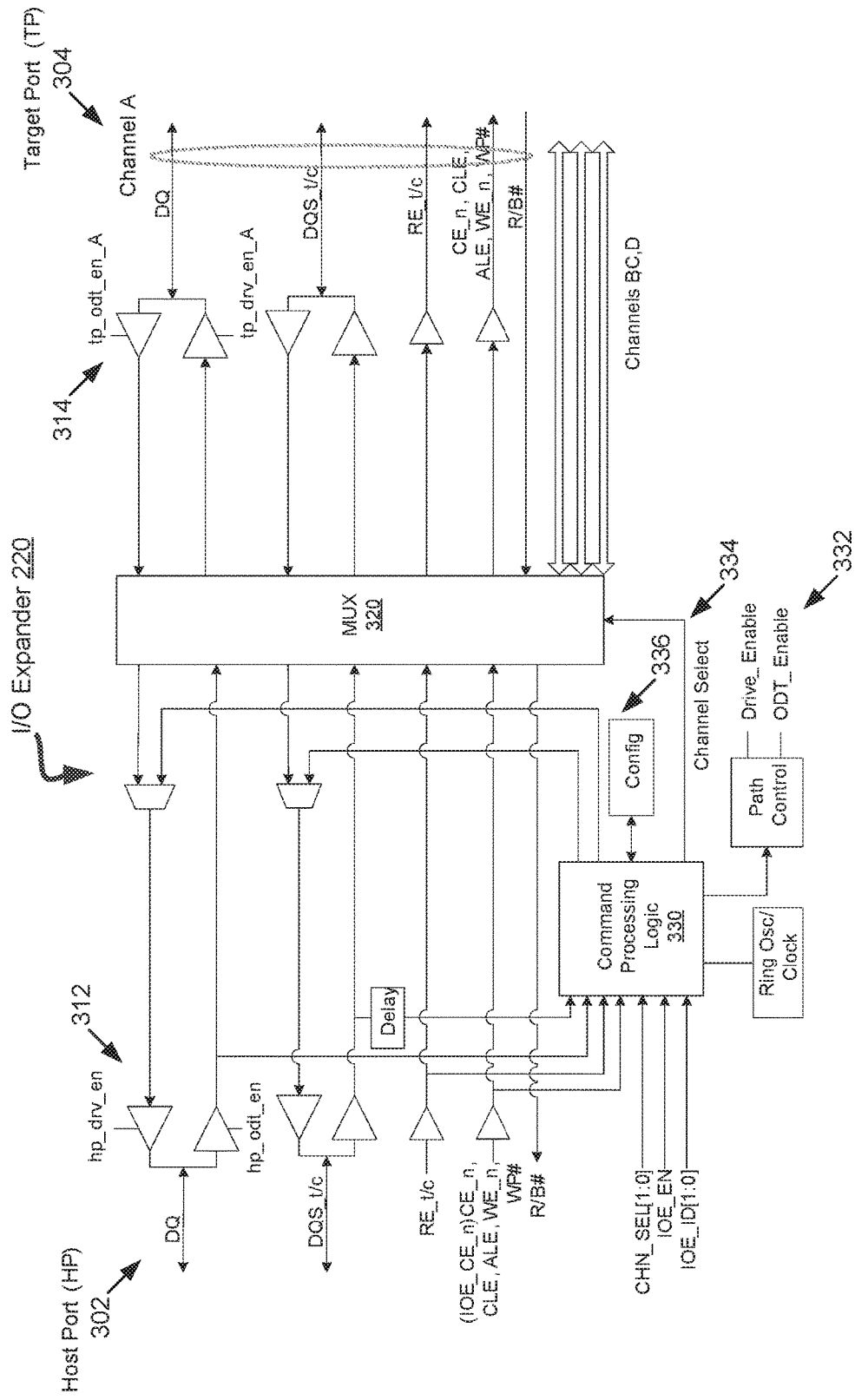
FIG. 3 is a block diagram illustrating an I/O expander for use in a memory sub-system with an input/output port constrained memory sub-system controller to increase the storage capacity in accordance with some embodiments of the present disclosure.

FIG. 3 is a block diagram illustrating an I/O expander 220 for use in a memory sub-system with an input/output port constrained memory sub-system controller to increase the storage capacity in accordance with some embodiments of the present disclosure. The structure and layout of I/O expander 220 illustrated in FIG. 3 can be representative of the structure and layout of other I/O expanders in the memory sub-system 110, such as I/O expander 222. In other embodiments, the other I/O expanders can have some other structure and/or layout. In one embodiment, I/O expander 220 includes a host port 302 configured to couple to a corresponding host channel, such as host channel 210, and a target port 304 configured to couple to a number of expansion channels, such as Channels A, B, C, D, which can be representative of expansion channels 230, 232, 234, 236, for example. I/O expander further includes a first set of I/O buffers 312, which can be coupled to or form at least a portion of host port 302 to send and receive signals on the host channel 210, and a second set of I/O buffers 314, which can be coupled to or form at least a portion of target port 304 and send and receive signals on the expansion channels A, B, C, D. In addition, I/O expander circuit 220 includes a selection circuit 320 coupled to the first set of I/O buffers 312 and to the second set of I/O buffers 314, and command proceeding logic 330 to enable the selection circuit 320 to route signals on a selected one of the expansion channels A, B, C, D. As described above, each of the expansion channels A, B, C, D can be coupled to a corresponding subset of the memory die in memory device 130.

In one embodiment, the first set of I/O buffers 312 includes an I/O buffer pair coupled to a data line (DQ) of the host channel 210 and an I/O buffer pair coupled to a data strobe line (DQS) of the host channel 210. Since the data line DQ and the data strobe line DQS are bidirectional paths, one buffer in each I/O buffer pair buffers incoming signals from memory sub-system controller 115 and the other buffer in each I/O buffer pair buffers outgoing signals. Similarly, the second set of I/O buffers 314 includes an I/O buffer pair coupled to the data line (DQ) of expansion channel A and an I/O buffer pair coupled to the data strobe line (DQS) of expansion channel A. One buffer in each of these I/O buffer pairs buffers signals being sent to the memory die coupled to expansion channel A and the other buffer in each I/O buffer pair buffers signals received from the memory die.

In one embodiment, command processing logic 330 monitors the signals received on host channel 210, determines whether a signal received on the host channel 210 corresponds to a write request or a read request, and selectively enables corresponding buffers in the first set of I/O buffers 312 and the second set of I/O buffers 314. In one embodiment, command processing logic 330 tracks the command cycle states to ensure that the shared busses, DQ and DQS, are driven in the proper direction and that on-die termination (ODT) is engaged at the appropriate times for the transfer sequences. The command cycle phases (e.g., address cycle, data transfer cycle) are identified using specific control signals (e.g., from the ONFI interface) received at host port 302 over the host channel 210, as will be described herein. The DQ signal is a bidirectional signal used for transferring address, command, and data to and from the I/O expander 220. CE_n is a chip enable signal that selects the target I/O expander. ALE is an address latch enable signal that indicates an address bus cycle, and CLE is a command latch enable signal that indicates a command bus cycle. DQS is a data strobe signal used to strobe data transfer over the data line DQ. RE is a read enable signal sent by memory sub-system controller 115 to toggle NAND data transfer for read operations. WE is a write enable signal that controls latching of commands and addresses and WP is a write protect signal.

In one embodiment, command processing logic generates a number of path control signals 332 which enable various buffers in I/O expander 220, as appropriate. hp_drv_en is a host port drive enable signal which enables driving host port DQ and DQS for IOE-to-Controller transfer (e.g., Read Page data transfer). hp_odt_en is a host port ODT enable signal which enables ODT on host port DQ and DQS for Controller-to-IOE transfer (e.g., Program Page data transfer). This signal can be gated by whether ODT is enabled and whether ODT is required for the corresponding command. tp_drv_en is a target port drive enable signal which enables driving target port DQ and DQS for IOE-to-NAND transfer (e.g., Command/Address Cycles to NAND and Program Page data transfer). tp_odt_en is a target port receive and ODT enable signal which conditionally enables ODT on target port DQ and DQS for NAND-to-IOE transfer (e.g., Read Page data transfer). This signal can be gated by whether ODT is enabled and whether ODT is required for the corresponding command. Accordingly, when a write request is received, command processing logic 330 can assert hp_odt_en and tp_drive_en_A to enable the corresponding I/O buffers from the first set of I/O buffers 312 and the second set of I/O buffers 314, respectively. Conversely, when a read request is received, command processing logic 330 can assert tp_odt_en_A and hp_drv_en to enable the corresponding I/O buffers from the second set of I/O buffers 314 and the first set of I/O buffers 312, respectively.

In one embodiment, the signal received on host channel 210 includes an I/O expander identifier and a memory address. The I/O expander identifier can uniquely identify a given I/O expander, such as I/O expander 220, among multiple I/O expanders coupled to the same host channel. The memory address can uniquely identify a given memory location on a specific memory die among the multiple memory die coupled to the various expansion channels A, B, C, D, of the identified I/O expander. In one embodiment, as will be described in more detail below with respect to FIG. 4, command processing logic 330 can compare the I/O expander identifier from the signal received on host channel 210 to a volume identifier associated with I/O expander circuit 220. In response to the I/O expander identifier matching the volume identifier, command processing logic 330 determines a memory die corresponding to the memory address and identifies a corresponding expansion channel coupled to the determined memory die. In one embodiment, command processing logic 330 applies a channel select signal 334 to selection circuit 320 (e.g., a multiplexer) to cause the selection circuit 320 to route the received signal(s) on the corresponding one of expansion channels A, B, C, D. Similarly, the channel select signal 334 can cause the selection circuit 320 to route signals from the expansion channel back to the target port 302 and on to the host channel 210.

In one embodiment, command processing logic 330 is configured according to configuration values 336 pertaining to, for example, ODT and drive strength, among others. ODT configuration for the host port 302 interface is performed using an ONFI command, while there can be vendor specific configuration commands for the target port 304 interface. This vendor specific setting can be applied across all of the expansion channels A, B, C, D. In one embodiment, ODT can support 50, 75, and 150 Ohm terminations. Similarly, the drive strength for the host port 302 interface is performed using an standard set feature command, while there can be vendor specific address for the target port 304 interface. The drive strength can support 37.5 and 50 Ohm terminations. In one embodiment, the configuration values are part of a configuration template associated with a capacity of the memory die in the memory device 130. For example, the configuration template can include predefined configuration values (e.g., for ODT and drive strength) that are optimized for a given capacity.

Figure 4A:
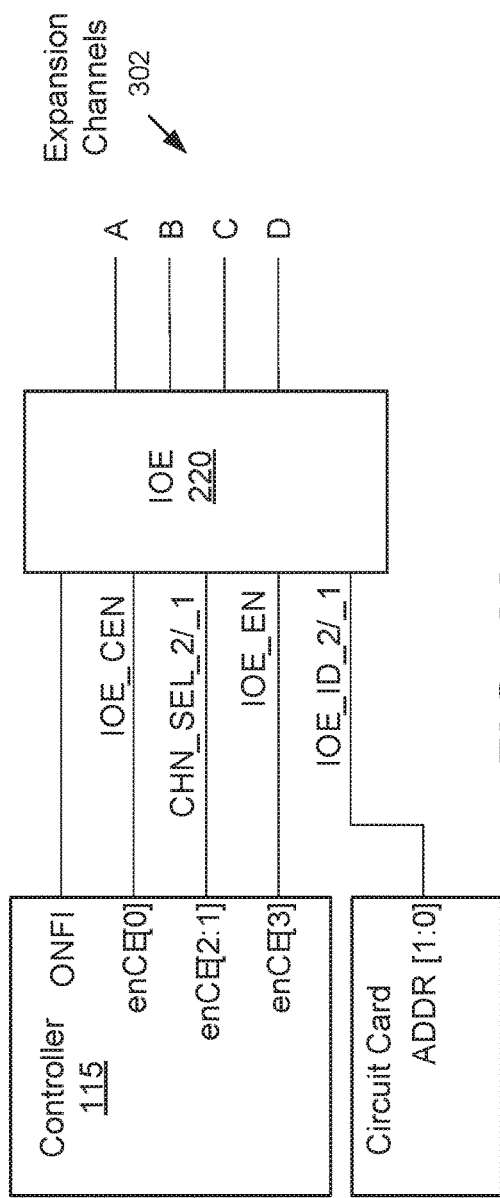
FIG. 4A is a block diagram illustrating expansion channel selection for an I/O expander in a memory subsystem in accordance with some embodiments of the present disclosure.

FIG. 4A is a block diagram illustrating expansion channel selection for an I/O expander 220 in a memory subsystem in accordance with some embodiments of the present disclosure. In one embodiment, the expansion channel selection is based on encoded chip enable (CE) signals received by I/O expander 220 from memory sub-system controller 115 over host channel 210, along with an IOE identifier signal (ADDR) used for IOE volume selection. As illustrated in FIG. 4A, this configuration can support up to four multi-drop I/O expander packages on a single host channel. enCE[0] is a chip enable signal for ONFI command sequences. enCE[2:1] is a chip enable signal used when I/O expander 220 is not configured in a volume select mode and can indicate a particular expansion channel A, B, C, D. When I/O expander 220 is configured in the volume select mode, enCE[2:1] can be ignored, as the channel selection is based on a volume identifier included in the ONFI command signal. enCE[3] is chip enable signal that indicates where received commands are directed to memory die coupled to the expansion channels or to I/O expander 220 itself (e.g., command processing).

In one embodiment, ADDR[1:0] is an address signal tied to a given logical value externally to the package (e.g., directly on the circuit card). The address signal provides an I/O expander identifier that uniquely identifies I/O expander 220 and can be used in the volume select mode. In the volume select mode, command processing logic 330 of I/O expander 220 can compare a volume identifier included in the ONFI command signal received on the host channel 210 to the I/O expander identifier associated with the I/O expander 220. If the volume identifier matches the I/O expander identifier, command processing logic 330 can determine that the ONFI command signal is addressed to I/O expander 220. If the volume identifier and the I/O expander do not match, I/O expander 220 can ignore the ONFI command, as it is addressed to a different I/O expander coupled to the host channel 210. Thus, in response to the volume identifier matching the I/O expander identifier, command processing logic 330 can determine a memory die corresponding to a memory address included in the ONFI command signal. Multi-Die Stack (MDS) addressing allows for multiple die to share a common chip enable signal on the host channel 210. With MDS, addressing uses the extended "6 address cycle" mode to support four or more LUNs per host channel that share a common chip enable. The addressing can be extended to include 3-bits to encode the LUN address on the channel.

Figure 4B:
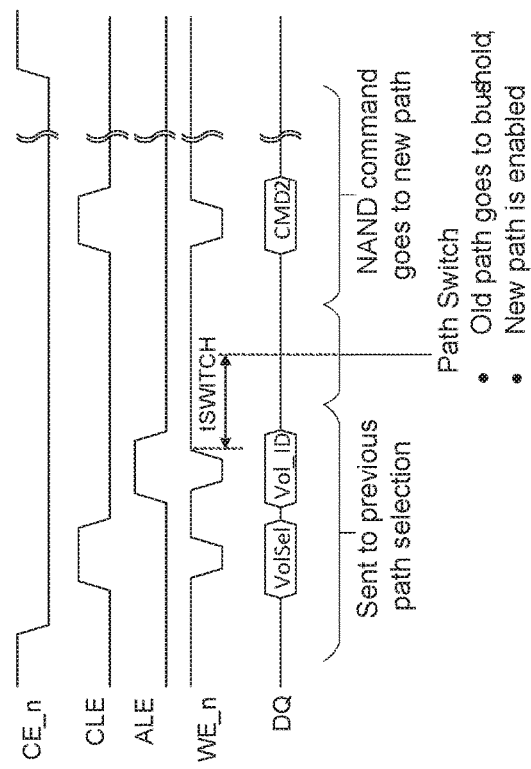
FIG. 4B is a timing diagram illustrating expansion channel selection for an I/O expander in a memory subsystem in accordance with some embodiments of the present disclosure.

FIG. 4B is a timing diagram illustrating expansion channel selection for an I/O expander in a memory sub-system in accordance with some embodiments of the present disclosure. In one embodiment, the volume select mode is disabled upon power up of the memory sub-system 110. In a multi-drop application, memory sub-system controller 115 can enable the volume select mode with a set feature command issued to all of the I/O expanders in the memory sub-system. In one embodiment, each of the I/O expanders snoop on the host channel 210, regardless of their selection status, in order to detect the volume select command. In one embodiment, the volume identifier includes both the IOE_SEL and CHN_SEL. Command processing logic 330 compares the command's volume identifier (Vol_ID), with the IOE_SEL and the CHN_SEL values. If the IOE_SEL matches the IOE_ID wired to the package, that I/O expander shall transition to a selected (i.e., active) state, otherwise, the IOE transitions or stays in a non-selected state. The CHN_SEL signal is used to select the expansion channel on the newly activated I/O expander. In one embodiment, the volume select command is sent by the memory sub-system controller 115 as a normal ONFI command. As shown in FIG. 4B, the volume select command is forward through on the previously selected path. Following the command, the previous expansion channel is placed into a bus hold state. The selected I/O expander switches to enable the new expansion channel path during the tSWITCH time, which can be defined to ensure that the minimum time is greater than tCAH/tCALH and the maximum time is less than tVDLY. The next NAND command, CMD2, issued by the memory sub-system controller 115 can be directed to the new expansion channel.

Figure 5:
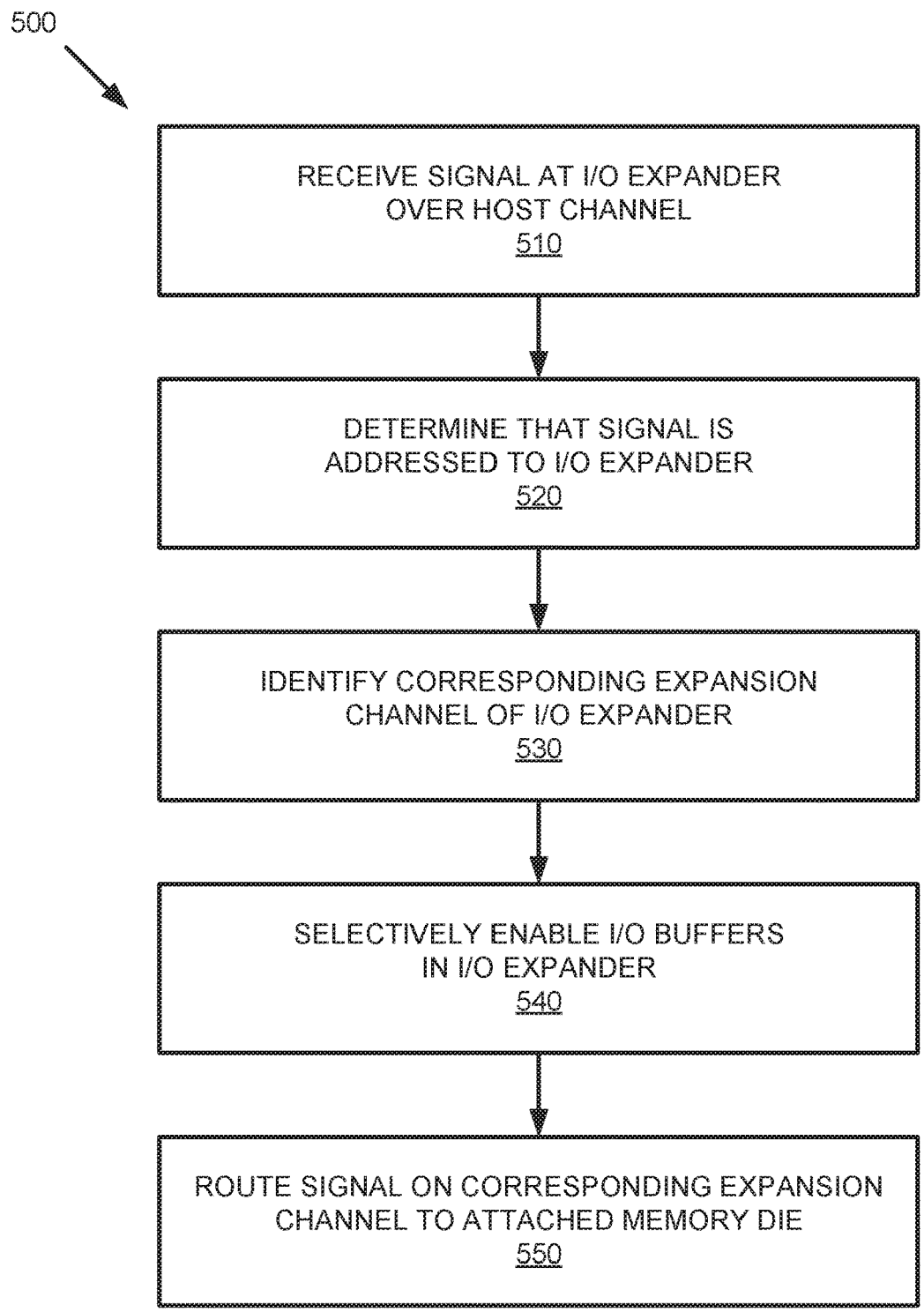
FIG. 5 is a flow diagram of an example method of operation of an I/O expander in a memory sub-system with an input/output port constrained memory sub-system controller to increase the storage capacity in accordance with some embodiments of the present disclosure.

FIG. 5 is a flow diagram of an example method of operation of an I/O expander in a memory sub-system with an input/output port constrained memory sub-system controller to increase the storage capacity in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by an I/O expander, such as I/O expander 220, as shown in FIG. 2-FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a signal on host channel 210. In one embodiment, the signal is an ONFI signal sent by memory controller sub-system controller 115 on host channel 210. Memory sub-system 110 can be a multi-drop system where there are multiple devices (e.g., I/O expander circuits) coupled to the same host channel 210. As such, each of the I/O expander circuits can receive the same signal. In one embodiment, the signal includes a volume identifier, which can be used to identify the I/O expander to which the signal is addressed, and a memory address, which can be used to determine an expansion channel and memory die associated with that I/O expander.

At operations 520, the processing logic determines that the signal is addressed to I/O expander 220. In one embodiment, command processing logic 330 of I/O expander 220 can compare the volume identifier from the signal received on host channel 210 to an I/O expander identifier associated with I/O expander circuit 220. If the volume identifier matches the I/O expander identifier, command processing logic 330 can determine that the ONFI command signal is addressed to I/O expander 220. If the volume identifier and the I/O expander do not match, I/O expander 220 can ignore the ONFI command, as it is addressed to a different I/O expander coupled to the host channel 210.

At operation 530, the processing logic identifies a corresponding expansion channel of I/O expander 220. In response to the volume identifier matching the I/O expander identifier, command processing logic can determine a memory die corresponding to the memory address. In one embodiment, a multi-die stack addressing scheme allows for multiple die to share a common chip enable signal on the host channel 210. Thus, with multi-die stack addressing, the multiple memory die 240, 242, 244, 246 attached to multiple expansion channels 230, 232, 234, 236 can share a common address space. Accordingly, command processing logic 330 can decode the memory address received in the signal on host channel 210 and determine the relevant memory die and the corresponding expansion channel to which that memory die is attached.

At operation 540, the processing logic selectively enables I/O buffers corresponding to the selected expansion channel. In one embodiment, command processing logic 330 determines whether the ONFI command corresponds to a write request or a read request, and generates path control signals 332 accordingly. When a write request is received, command processing logic 330 can assert hp_odt_en and to_drive_en_A to enable the corresponding I/O buffers from the first set of I/O buffers 312 and the second set of I/O buffers 314, respectively. When a read request is received, command processing logic 330 can assert tp_odt_en_A and hp_drv_en to enable the corresponding I/O buffers from the second set of I/O buffers 314 and the first set of I/O buffers 312, respectively.

At operation 550, the processing logic routes the signal on the selected expansion channel to a subset of the plurality of memory die coupled to the selected expansion channel. In one embodiment, command processing logic 330 applies a channel select signal 334 to selection circuit 320 (e.g., a multiplexer) to cause the selection circuit 320 to route the received signal(s) on the corresponding one of expansion channels A, B, C, D. Similarly, the channel select signal 334 can cause the selection circuit 320 to route signals from the expansion channel back to the target port 302 and on to the host channel 210.

Figure 6:
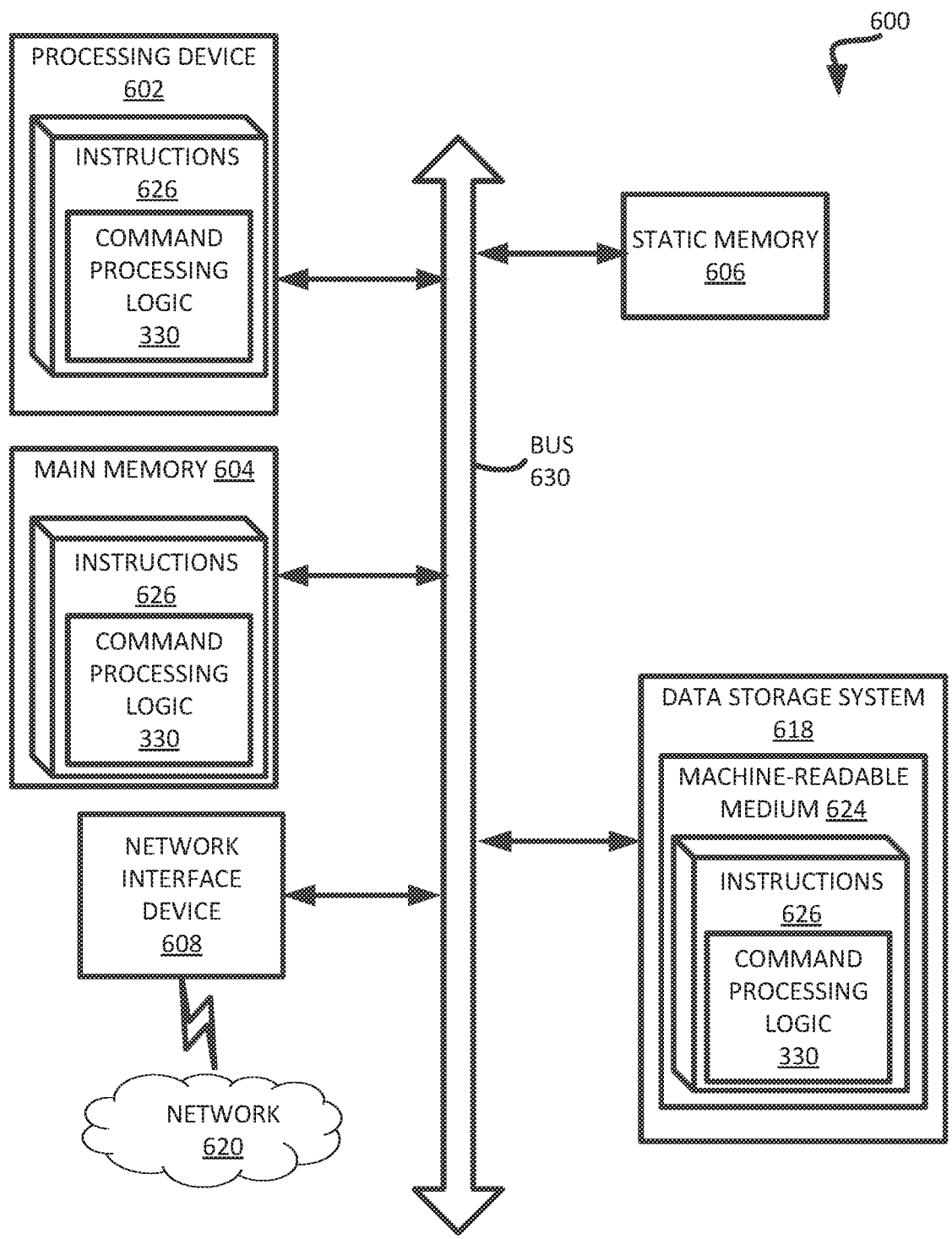
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller or other component (e.g., to execute instructions to perform operations corresponding to I/O expander 220 or command processing logic 330 of FIG. 3). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to I/O expander 220 or command processing logic 330 of FIG. 3. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
a memory sub-system controller comprising at least one host channel;
a memory device comprising a plurality of memory die; and
at least one input/output (I/O) expander circuit coupled between the at least one host channel of the memory sub-system controller and to the memory device to connect the plurality of memory die to the memory sub-system controller, the at least one I/O expander circuit comprising:
one or more I/O buffers to send and receive signals on the at least one host channel;
a selection circuit coupled to the one or more I/O buffers; and
command processing logic to enable the selection circuit to route the signals on a selected one of a plurality of expansion channels coupled to the at least one I/O expander circuit, wherein each of the plurality of expansion channels is coupled to a corresponding subset of the plurality of memory die.

2. The memory sub-system of claim 1, wherein the one or more I/O buffers comprise:
a first I/O buffer pair coupled to the at least one host channel; and
a second I/O buffer pair coupled to the selected one of the plurality of expansion channels.

3. The memory sub-system of claim 2, wherein the command processing logic is configured to:
monitor the signals received on the at least one host channel;
determine whether a signal received on the at least one host channel corresponds to a write request or a read request from the memory sub-system controller; and
selectively enable a corresponding I/O buffer of the first I/O buffer pair and a corresponding buffer of the second I/O buffer pair.

4. The memory sub-system of claim 3, wherein the signal received on the at least one host channel comprises a volume identifier and a memory address, and wherein the command processing logic is configured to:

compare the volume identifier from the signal received on the at least one host channel to an I/O expander identifier associated with the at least one I/O expander circuit;

in response to the volume identifier matching the I/O expander identifier, determine a memory die corresponding to the memory address; and identify the selected one of the plurality of expansion channels coupled to the determined memory die.

5. The memory sub-system of claim 1, wherein the one or more I/O buffers to limit an impedance load presented on the at least one host channel to the impedance load of the corresponding subset of the plurality of memory die associated with the selected one of the plurality of expansion channels.

6. The memory sub-system of claim 1, further comprising:
a plurality of I/O expander circuits coupled to the at least one host channel, wherein each of the plurality of I/O expander circuits is coupled to four expansion channels, wherein each of the four expansion channels of each of the plurality of I/O expander circuits is coupled to a corresponding subset of four of the plurality of memory die.

7. The memory sub-system of claim 1, wherein the memory sub-system controller comprises a plurality of host channels, and further comprising:
at least one input/output expander circuit coupled to each of the plurality of host channels.

8. An input/output (I/O) expander circuit comprising:
a host port configured to couple to at least one host channel of a memory sub-system controller;
a first set of I/O buffers coupled to the host port to send and receive signals on the at least one host channel;
a selection circuit coupled to the first set of I/O buffers;
a target port configured to couple to a plurality of expansion channels, wherein each of the plurality of expansion channels is coupled to a corresponding subset of a plurality of memory die, wherein the I/O expander circuit is to connect the plurality of memory die to the memory sub-system controller; and
command processing logic to enable the selection circuit to route the signals on a selected one of the plurality of expansion channels.

9. The I/O expander circuit of claim 8, further comprising:
a second set of I/O buffers coupled to the target port to send and receive signals on the plurality of expansion channels.

10. The I/O expander circuit of claim 9, wherein the command processing logic is configured to:
monitor the signals received on the at least one host channel;
determine whether a signal received on the at least one host channel corresponds to a write request or a read request from the memory sub-system controller; and
selectively enable a corresponding I/O buffer of the first set of I/O buffers and a corresponding I/O buffer of the second set of I/O buffers.

11. The I/O expander circuit of claim 10, wherein the signal received on the at least one host channel comprises a volume identifier and a memory address, and wherein the command processing logic is configured to:
compare the volume identifier from the signal received on the at least one host channel to an I/O expander identifier associated with the at least one I/O expander circuit;

in response to the volume identifier matching the I/O expander identifier, determine a memory die corresponding to the memory address; and identify the selected one of the plurality of expansion channels coupled to the determined memory die.

12. The I/O expander circuit of claim 8, wherein the first set of I/O buffers to limit an impedance load presented on the at least one host channel to the impedance load of the corresponding subset of the plurality of memory die associated with the selected one of the plurality of expansion channels.

13. The I/O expander circuit of claim 8, wherein the wherein the command processing logic is configured according to configuration values for on-die termination (ODT) at the host port and the target port based on a command template associated with a capacity of the plurality of memory die.

14. A memory device comprising:
a plurality of memory die; and
at least one input/output (I/O) expander circuit configured to couple to at least one host channel of a memory sub-system controller and coupled to the plurality of memory devices, the I/O expander circuit to connect the plurality of memory die to the memory sub-system controller, the at least one I/O expander circuit comprising:
one or more I/O buffers configured to send and receive signals on the at least one host channel;
a selection circuit coupled to the one or more I/O buffers; and
command processing logic to enable the selection circuit to route the signals on a selected one of a plurality of expansion channels coupled to the at least one I/O expander circuit, wherein each of the plurality of expansion channels is coupled to a corresponding subset of the plurality of memory die.

15. The memory device of claim 14, wherein the one or more I/O buffers comprise:
a first I/O buffer pair configured to couple to the at least one host channel; and
a second I/O buffer pair coupled to the selected one of the plurality of expansion channels.

16. The memory device of claim 15, wherein the command processing logic is configured to:
monitor the signals received on the at least one host channel;
determine whether a signal received on the at least one host channel corresponds to a write request or a read request from the memory sub-system controller; and
selectively enable a corresponding I/O buffer of the first I/O buffer pair and a corresponding buffer of the second I/O buffer pair.

17. The memory device of claim 16, wherein the signal received on the at least one host channel comprises a volume identifier and a memory address, and wherein the command processing logic is configured to:
compare the volume identifier from the signal received on the at least one host channel to an I/O expander identifier associated with the at least one I/O expander circuit;

in response to the volume identifier matching the I/O expander identifier, determine a memory die corresponding to the memory address; and identify the selected one of the plurality of expansion channels coupled to the determined memory die.

18. The memory device of claim 14, wherein the one or more I/O buffers to limit an impedance load presented on the at least one host channel to the impedance load of the corresponding subset of the plurality of memory die associated with the selected one of the plurality of expansion channels.

19. The memory device of claim 14, wherein the command processing logic is configured according to configuration values for on-die termination (ODT) in least one I/O expander circuit based on a command template associated with a capacity of the plurality of memory die.

20. The memory device of claim 14, further comprising:
 a plurality of I/O expander circuits configured to couple to the at least one host channel, wherein each of the plurality of I/O expander circuits is coupled to four expansion channels, wherein each of the four expansion channels of each of the plurality of I/O expander circuits is coupled to a corresponding subset of four of the plurality of memory die.

* * * * *